US006236735B1

(12) United States Patent
Bjorner et al.

(10) Patent No.: US 6,236,735 B1
(45) Date of Patent: *May 22, 2001

(54) TWO CAMERA SYSTEM FOR LOCATING AND STORING INDICIA ON CONVEYED ITEMS

(75) Inventors: Johannes A. S. Bjorner, Woodbury; Kenneth Alan Lais, New Fairfield, both of CT (US); James S. Morton, Atlanta, GA (US); James V. Recktenwalt, New Milford, CT (US)

(73) Assignee: United Parcel Service of America, Inc., Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/967,287

(22) Filed: Nov. 7, 1997

Related U.S. Application Data

(63) Continuation of application No. 08/536,512, filed on Sep. 29, 1995, now abandoned, which is a continuation-in-part of application No. 08/419,176, filed on Apr. 10, 1995, now abandoned.

(51) Int. Cl.[7] ..................................................... G06K 9/00
(52) U.S. Cl. ....................................... 382/101; 250/559.44
(58) Field of Search ..................................... 382/100–102, 382/139–140, 181, 306, 318, 297, 163, 190, 216, 312; 235/375, 462, 462.32, 462.42; 347/100; 348/33, 162, 86, 91, 92, 94, 95, 262; 250/559.44; 705/406; 350/435

(56) References Cited

U.S. PATENT DOCUMENTS

Re. 029,104 * 1/1977 Shepard ................................ 382/163

3,444,517   5/1969   Rabinow ................................ 382/175
3,603,728   9/1971   Arimura ................................. 178/6.8

(List continued on next page.)

FOREIGN PATENT DOCUMENTS 2047821   2/1988   (CA) .

OTHER PUBLICATIONS

"Use of Synthetic Discriminant Functions for Handwritten Signature Verification," by Timothy S. Wilkinson, Dorothy A. Pender, and Joseph W. Goodman, *Applied Optics*, Aug. 1991, vol. 30, No. 23, pp. 3345–3353.
Anonymous, "System for Determining Form Alignment, " *IBM Technical Disclosure Bulletin*, vol. 30, No. 11, p. 57 (Apr. 1988).
Anonymous, "Registration Marks for Machine Vision," *Research Disclosure*, No. 349, p. 292 (May 1993).

*Primary Examiner*—Jay Patel
(74) *Attorney, Agent, or Firm*—Alston & Bird LLP (57) ABSTRACT

A two camera over-the-belt optical character recognition (OCR) system for reading the destination addresses on parcels carried on a conveyor belt. The parcels bear an orientation defining fluorescent ink fiduciary mark that is typically stamped on the parcel in the same area as the destination address. The fiduciary mark is located approximately in the center of the destination address block and oriented in the same direction as the underlying destination address. The first camera, a low resolution CCD camera, captures an image of the fiduciary mark. A host computer stores an image of the fiduciary mark, determines the position and orientation of the fiduciary mark, and defines a region of interest about the fiduciary mark. The second camera, a high resolution CCD camera, captures a greyscale image of the conveyor and the parcels carried on the conveyor. The host computer extracts and stores the portion of the high resolution image that is within the region of interest including the text defining the destination address of the parcel. The host computer then rotates and displays the text image and/or transmits the text image to a text reader.

14 Claims, 9 Drawing Sheets

U.S. PATENT DOCUMENTS

| | | | |
|---|---|---|---|
| 3,662,181 | 5/1972 | Hercher et al. ........................ | 250/219 |
| 3,663,814 | 5/1972 | Madsen ................................ | 250/83.3 |
| 3,666,946 | 5/1972 | Trimble ................................ | 250/83.3 |
| 3,674,924 | 7/1972 | Fischer et al. ......................... | 178/6.8 |
| 3,744,025 | 7/1973 | Bilgutay .............................. | 390/146.3 |
| 3,801,775 | 4/1974 | Acker .................................. | 235/470 |
| 3,885,229 | 5/1975 | Negita et al. ......................... | 382/317 |
| 3,891,324 | 6/1975 | Davies ................................ | 356/156 |
| 3,949,363 | 4/1976 | Holm .................................. | 390/146.3 |
| 4,402,088 | 8/1983 | McWaters et al. .................... | 382/68 |
| 4,403,339 | 9/1983 | Wevelsiep et al. .................... | 382/44 |
| 4,408,344 | 10/1983 | McWaters et al. .................... | 382/62 |
| 4,411,016 | 10/1983 | Wakeland ............................ | 382/62 |
| 4,516,265 * | 5/1985 | Kizu et al. ........................... | 382/48 |
| 4,538,072 | 8/1985 | Immler et al. ........................ | 250/568 |
| 4,542,528 | 9/1985 | Sanner et al. ......................... | 382/62 |
| 4,642,687 * | 2/1987 | Wedgwood et al. .................. | 348/162 |
| 4,736,109 | 4/1988 | Dvorsak .............................. | 250/566 |
| 4,745,269 | 5/1988 | Van Gils .............................. | 568/490 |
| 4,758,716 | 7/1988 | Mayer et al. ......................... | 235/470 |
| 4,760,247 | 7/1988 | Keane et al. ......................... | 235/454 |
| 4,776,464 | 10/1988 | Miller et al. ......................... | 209/3.3 |
| 4,803,737 | 2/1989 | Sato et al. ............................ | 382/313 |
| 4,822,986 | 4/1989 | Guthmueller et al. ............... | 235/462 |
| 4,874,936 | 10/1989 | Chandler et al. ..................... | 235/494 |
| 4,896,029 | 1/1990 | Chandler et al. ..................... | 235/494 |
| 4,924,078 | 5/1990 | Sant' Anselmo et al. ........... | 235/494 |
| 4,955,062 | 9/1990 | Terui .................................. | 382/144 |
| 4,972,494 | 11/1990 | White et al. ......................... | 382/8 |
| 4,998,010 | 3/1991 | Chandler et al. ..................... | 235/494 |
| 5,003,613 * | 3/1991 | Lovelady et al. ..................... | 382/163 |
| 5,065,237 | 11/1991 | Tsikos et al. ......................... | 358/101 |
| 5,103,489 * | 4/1992 | Miette ................................. | 382/48 |
| 5,120,940 | 6/1992 | Willsie ................................ | 235/462 |
| 5,132,808 | 7/1992 | Higuchi et al. ....................... | 358/403 |
| 5,135,569 * | 8/1992 | Mathias .............................. | 106/31.32 |
| 5,138,140 | 8/1992 | Siemiatkowski et al. ........... | 235/462 |
| 5,138,465 | 8/1992 | Ng et al. .............................. | 358/453 |
| 5,153,418 | 10/1992 | Batterman et al. ................... | 235/494 |
| 5,155,343 | 10/1992 | Chandler et al. ..................... | 235/462 |
| 5,189,292 | 2/1993 | Batterman et al. ................... | 235/494 |
| 5,199,084 | 3/1993 | Kishi et al. ........................... | 382/48 |
| 5,264,700 | 11/1993 | Tommasini et al. ................. | 250/372 |
| 5,291,002 * | 3/1994 | Agnew et al. ........................ | 235/375 |
| 5,307,423 | 4/1994 | Gupta et al. .......................... | 382/11 |
| 5,308,960 | 5/1994 | Smith et al. .......................... | 235/454 |
| 5,311,999 * | 5/1994 | Malow et al. ........................ | 209/583 |
| 5,326,959 | 7/1994 | Perazza ................................ | 235/379 |
| 5,327,171 | 7/1994 | Smith et al. .......................... | 398/223 |
| 5,331,151 | 7/1994 | Cochran et al. ...................... | 250/223 |
| 5,343,028 | 8/1994 | Figarella et al. ...................... | 235/462 |
| 5,365,597 | 11/1994 | Holeva ................................. | 382/8 |
| 5,542,971 * | 8/1996 | Auslander et al. ................... | 106/31.15 |
| 5,642,442 * | 6/1997 | Morton et al. ........................ | 382/287 |
| 5,745,173 * | 4/1998 | Edwards et al. ...................... | 348/208 |
| 5,770,841 * | 6/1998 | Moed et al. .......................... | 235/375 |
| 5,865,471 * | 2/1999 | Nohr et al. ............................ | 283/85 |

* cited by examiner

TWO CAMERA SYSTEM FOR LOCATING AND STORING INDICIA ON CONVEYED ITEMS

This is a continuation of application Ser. No. 08/536,512 filed Sep. 29, 1995 now abandoned.

REFERENCE TO RELATED APPLICATION

This application is a continuation-in-part of the commonly owned pending U.S. patent application Ser. No. 08/419,176, now abandoned "Method for Locating the Position and Orientation of a Fiduciary Mark" filed Apr. 10, 1995, inventors James S. Morton and James V. Recktenwalt.

TECHNICAL FIELD

The present invention relates to image processing, and more particularly relates to over-the-belt optical character recognition systems. Specifically, the present invention relates to a two camera system for reading the destination address on packages moving along a conveyor.

BACKGROUND OF THE INVENTION

For years, machines have been used to scan parcels as they move along a conveyor. Over-the-belt optical character recognition (OCR) systems have been recently developed that can capture an image of the surface of a parcel as it moves along a conveyor, and then create and process a representation of the image. The fundamental physical components of an OCR system are a sensor, an analog-to-digital (A/D) converter, and a computer comprising a central processing unit (CPU) and a memory. The individual physical components of an OCR system are all well known in the art, and many alternative embodiments of each of the individual physical components are commercially available, with differing cost and performance characteristics. Much effort goes into finding the most efficient combinations of components for particular applications, and in the development of computer software programs that process the images created by these familiar physical components.

Charge-coupled device (CCD) sensor arrays are often used in OCR systems. A CCD camera consists of an array of electronic "pixels," each of which stores an accumulated charge according to the amount of light that strikes the pixel. A CCD camera is used to quickly capture an image of the surface of a parcel as it moves along a conveyor. The image is converted into digital format which may be stored as a bit map in a computer memory. The CCD array is then cleared as the charge within each pixel is read, and the array is ready to capture the image of another parcel or section of a parcel. In this manner, a single CCD camera is used to scan a great many parcels.

Computers that may be used to process the images captured by CCD cameras vary in computation speed and other parameters. Generally, a faster computer is more expensive than a slower computer, a computer with a large memory capacity is more expensive than a computer with a smaller memory capacity, and a special purpose computer is more expensive than a general purpose computer. There is therefore a financial motivation to use low speed, low memory, general purpose computers whenever such are suitable for a particular purpose.

Parcel delivery companies, such as United Parcel Service (UPS), could make extensive use of OCR reader systems. UPS ships millions of parcels every day. If OCR systems were used by parcel delivery companies such as UPS they would generate an enormous amount of computer data. There is therefore a need to limit the amount of image data that must be saved for processing by a text reader. There is also a need for computer systems that can quickly and accurately process the images created by CCD cameras. For example, computer systems have been developed that can attempt to read the destination address written on certain parcels, so that the parcels may be correctly routed to their destinations when the address is successfully read. Reading text is a sophisticated task, and a system capable of doing so is commensurately sophisticated and may comprise expensive equipment such as a high resolution CCD camera and a high speed, storage, and processing, or special purpose computer.

To the extent that less expensive equipment can perform less sophisticated tasks in an OCR system, more expensive equipment can be dedicated to reading text. Determining the location and orientation of the destination address on a package moving along a conveyor is an example of a function required of an OCR system that has been performed with sophisticated equipment than that is also used to read text. There is therefore a need for a system using low cost equipment such as a low resolution CCD camera and a general purpose computer to determine the location and orientation of the destination address on a package moving along a conveyor.

Miette, U.S. Pat. No. 5,103,489, describes a label, and a method and device for locating addresses on mailed articles to be sorted. The system uses a preprinted mailing label including an address locating mark located in a known relation to the area on the label where the destination address is likely to be written. The address locating mark is a black ink circle including a rotation specific image inside the circle. A space for the destination address is included on the label to the side and below the mark. The surface of the package is imaged with a single camera system, and the location and orientation of the mark is ascertained. The destination address is then read in the expected area, and at the expected orientation, with reference to the location and orientation of the detected mark.

The system described by Miette reduces the amount of data that must be processed by the text reader. The address locating mark is located on a mailed article in a known relationship to the position and orientation of the destination address. The text reader may then process only the data within a relatively small area and at an orientation defined with respect to the mark. The system described by Miette is used to scan closely arranged items such as magazines exiting an unstacking device. In such a system, the items to be scanned are of uniform size and shape, and little time elapses between consecutive items. Moreover, the entire surface of every item must be searched for the mailing label. Therefore, Miette is not concerned with limiting the amount of high resolution CCD camera data that must be stored for subsequent processing.

The single camera system described by Miette would have a significant disadvantage if applied to parcels moving along a conveyor because the address locating mark could not be used to limit the amount of CCD camera data that must be stored in a computer memory for processing by the text reader. A high resolution CCD camera scanning a moving conveyor, such as one suitable for use with a text reader, generates a tremendous amount of data. Most of the data is a useless image of the conveyor and the non-text bearing areas of the parcels moving along the conveyor; only a small percentage of the data includes the important destination address bearing portions of the parcels. The single camera system described by Miette would require storing all of the data generated by the high resolution CCD camera even though only a small portion of the data would be processed by a text reader. The system described by Miette also relies on preprinted address labels. It would be advantageous if an OCR system for a parcel handling system was not limited to reading addresses written on preprinted labels.

Kizu et al., U.S. Pat. No. 4,516,265, describes a two camera system that reads the postal (zip) codes on envelopes traveling on an envelope transport system. The two camera system includes a low resolution pre-scanner that coarsely scans the surface of the envelope. The position of the destination address block is determined from the coarse scan, and the coordinates of the destination address block with respect to the leading edge of the envelope are then passed to a second camera system. The second camera system scans the destination address block by first detecting the leading edge of the envelope. The second camera then starts scanning when the destination address block reaches the second camera and stops scanning when the destination address block moves past the second camera. A postal code reader then processes the high resolution scan and detects and reads the postal code.

The two camera system described by Kizu et al. does not use an address locating mark to determine the position and orientation of the destination address block on a letter. Rather, Kizu et al. relies on the positional relation and sizes of the indicia bearing areas (i.e., stamp and post mark, destination address block, and return address block) on the envelope. The position and size of the destination address block is then defined with respect to the leading edge of the envelope. The timing of the operation of the high resolution camera is then controlled to limit the amount of the surface of the envelope that is scanned with the high resolution camera. Thus, Kizu et al. relies on the envelope, and the destination address on the envelope, being properly oriented on the envelope transport system. Kizu et aL also relies on the envelope having a well defined leading edge.

The two camera system described by Kizu et al. would therefore not be suitable for an over-the-belt OCR system for arbitrarily positioned parcels bearing arbitrarily positioned destination address labels moving along a conveyor. The system described by Kizu et al. cannot ascertain the position and orientation of the destination address blocks on parcels with arbitrarily positioned destination address labels, such as those conveyed in a parcel handling system. Similarly, the system described by Kizu et aL does not have a method for reading the destination address on a parcel that does not have a well defined leading edge, such as a parcel with soft or irregular edges.

Therefore, after Miette and Kizu et al. there remains a need for an OCR system which minimizes the amount of high resolution CCD camera data that must be stored for processing by a text reader. There also remains a need for a two camera OCR system that can ascertain the orientation of arbitrarily positioned destination blocks on articles moving along a conveyor, such as those conveyed in a parcel handling system. There also remains a need for a two camera OCR system that can read information on a parcel that does not have a well defined leading edge.

SUMMARY OF THE INVENTION

The present invention meets the above objectives by providing a two camera system for reading indicia on conveyed items. The preferred embodiment is an over-the-belt OCR system for reading the destination addresses on parcels carried on a conveyor belt. The parcels bear an orientation defining fluorescent ink fiduciary mark that is typically stamped on the parcel in the same area as the destination address. The fiduciary mark is located approximately in the center of the destination address block and oriented in the same direction as the underlying destination address. The first camera, a low resolution CCD camera, captures an image of the fiduciary mark. A host computer stores an image of the fiduciary mark, determines the position and orientation of the fiduciary mark, and defines a region of interest about the fiduciary mark. The second camera, a high resolution CCD camera, captures a greyscale image of the conveyor and the parcels carried on the conveyor. The host computer extracts and stores the portion of the high resolution image that is within the region of interest including the text defining the destination address of the parcel. The host computer then rotates and displays the rotated text image and/or transmits the text image to a text reader.

Although the preferred embodiment of the present invention is described in the context of an over-the-belt OCR system using a fluorescent ink fiduciary mark, those skilled in the art will appreciate that the principles of the present invention may be applied to many other contexts in which a two camera system can read indicia on a substrate.

Generally described, the present invention is a method and system for reading indicia on a substrate. A first image of the substrate is captured with a first camera system, and the first image is stored in a computer memory. The position of a predefined mark within the first image is determined, and a region of interest is defined in association with the mark. A second image of the substrate is then captured with a second camera system, and the portion of the second image that is within the region of interest is stored in a computer memory. In this manner, the host computer only stores data from the second camera for the area within the region of interest.

According to one aspect of the present invention, the presence of indicia of a first type is detected in the image captured by the first camera system. In response to detecting indicia of the first type, the host computer begins storing the first image. Upon detecting the absence of indicia of the first type for a predetermined period, the host computer stops storing the first image. In this manner, the host computer only stores data from the first camera that corresponds to indicia of the first type.

According to another aspect of the present invention, the image captured by the second camera comprises indicia of a second type. The first image is composed of indicia other than indicia of the second type, and the second image is composed of indicia other than indicia of the first type.

In the preferred over-the-belt OCR system, the indicia of the first type is a fluorescent ink orientation defining fiduciary mark, and the indicia of the second type is the destination address on a parcel. The fiduciary mark and the destination address occupy the same area of the parcel. According to one aspect of the preferred embodiment, the first camera is a low resolution CCD camera and the second camera is a high resolution CCD camera. According to another aspect of the preferred embodiment, the orientation of the fiduciary mark is determined.

Therefore, it is an object of the present invention to provide a two-camera over-the-belt OCR system that minimizes the amount of high resolution CCD camera data that must be stored for processing by a text reader.

It is a further object of the present invention to provide a two camera OCR system that can ascertain the orientation of arbitrarily positioned destination address blocks on articles moving along a conveyor, such as those conveyed in a parcel handling system.

It is a further object of the present invention to provide a two camera OCR system that can read information on a parcel that does not have a well defined leading edge.

That the present invention and the preferred embodiments thereof improve over the drawbacks of the prior art and accomplish the objects of the invention set forth above will become apparent from the following detailed description of the preferred embodiments, claims, and drawings. Further objects and advantages of the present invention may become apparent from a review of the following detailed description of the preferred embodiments, claims, and drawings.

DESCRIPTION OF THE PREFERRED EMBODIMENTS

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, all or a portion of a process may be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers, work stations, or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Figure 1:
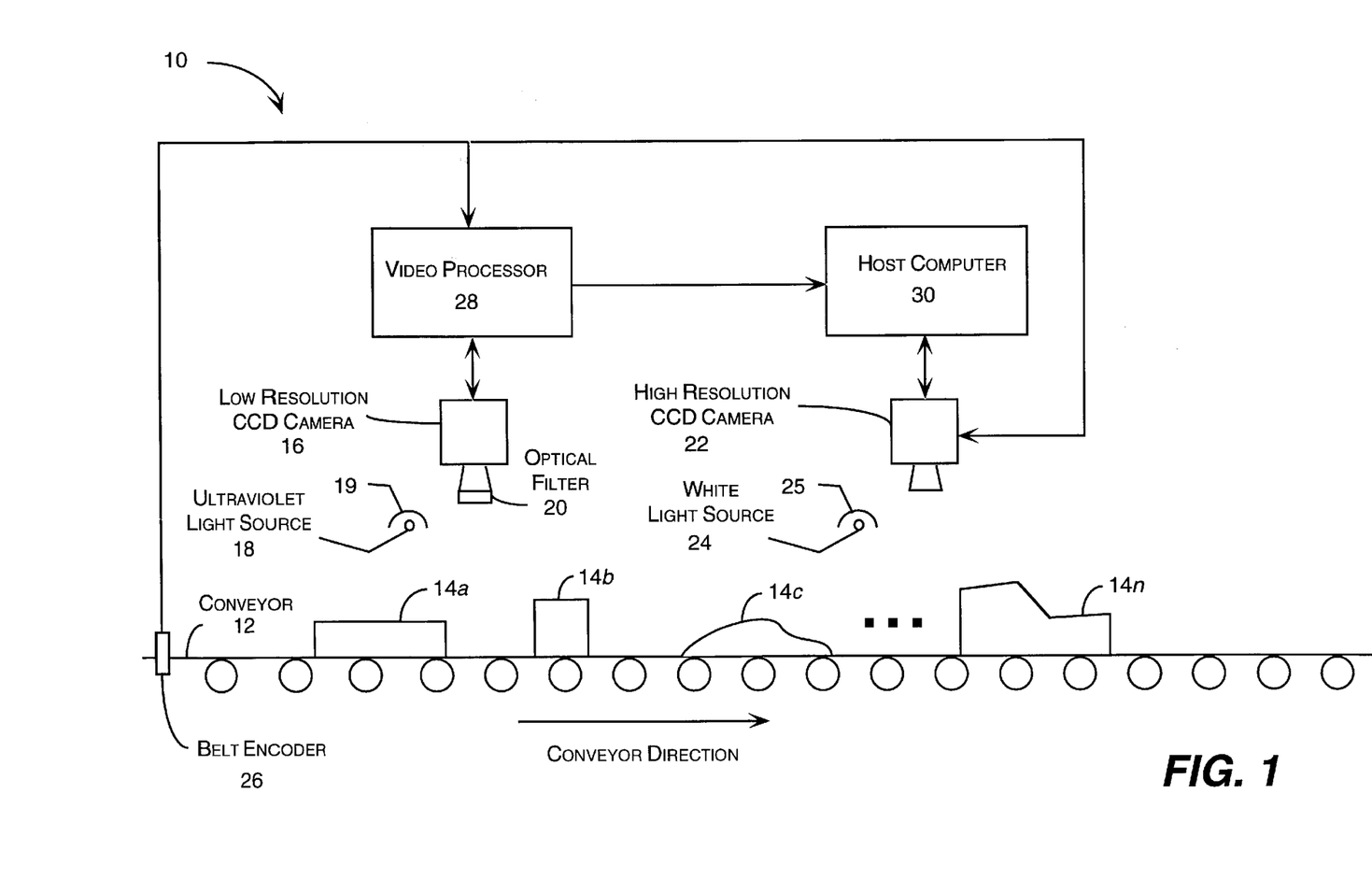
FIG. 1 is a diagram of an two camera over-the-belt Optical Character Recognition (OCR) system.

Referring now to the drawings, in which like numerals refer to like elements in the several views, FIG. 1 shows a two camera over-the-belt optical character recognition (OCR) system 10 including a preferred embodiment of the present invention. The OCR system 10 includes a conveyer 12 which carries parcels 14a through 14n. Conveyer 12 is preferably 18 inches wide and may carry approximately 3,600 parcels per hour, and may move at a rate of 100 feet per minute. Parcels 14a through 14n may vary in height, may have soft or irregular edges, and may be arbitrarily oriented on the conveyor 12. The preferred configuration shown in FIG. 1 having an 18 inch wide conveyor belt is adapted for handling relatively small parcels. It will be appreciated that alternative embodiments of the present invention that are adapted for handling larger or smaller parcels may be constructed in accordance with the principles of the present invention.

Generally described, the two camera OCR system 10 is operational to ascertain the position and orientation of a fluorescent ink fiduciary mark located within the destination address block on the surface of a parcel 14, to capture an image of the text comprising the destination address in a region of interest defined with respect to the position of the fiduciary mark, to rotate the text image by an angle defined with respect to the orientation of the fiduciary mark, and to transmit the rotated text image to a display device or to a computer-implemented text reader. The preferred fiduciary mark is described with more particularity with respect to FIGS. 2 and 3. Although the preferred embodiment of the present invention is described in the context of an over-the-belt OCR system using a fluorescent ink fiduciary mark, those skilled in the art will appreciate that the principles of the present invention may be applied to virtually any type of two camera system for reading indicia on a substrate.

The conveyor 12 moves a parcel 14 through the field of view of a low resolution CCD camera 16. The low resolution camera 16 is preferably a low resolution, monochrome, 256 pixel line-scan type camera such as a Thompson TH7806A, TH7931D. An ultraviolet light source 18 in conjunction with a reflector 19 illuminates the parcel 14 as it is conveyed through the viewing area of the low resolution camera 16, which captures an image of the surface of the parcel 14. The low resolution camera 16 is fitted with a commercially available optical filter 20 that passes yellow/green light and attenuates light in other portions of the visible spectrum. The low resolution camera 16 is thus configured to be responsive to yellow/green light such as that emitted by fluorescent ink exposed to ultraviolet light. More specifically, the optical filter 20 causes the low resolution camera 16 to be responsive to the yellow/green light emitted from the commercially available National Ink No. 35-48-J (Fluorescent Yellow) in response to ultraviolet light.

The conveyor 12 then moves the parcel 14 through the field of view of a high resolution CCD camera 22. The high resolution camera 22 is preferably a monochrome, pixel linescan type camera such as one using a Kodak KLI-5001 CCD chip. A white light source 24 in conjunction with a reflector 25 illuminates the parcel 14 as it is conveyed through the viewing area of the second camera 22, which captures an image of the surface of a parcel 14. The high resolution camera 22 is responsive to a grey-scale light pattern such as that reflected by black ink text on the surface of the parcel 14. The high resolution camera 22 is relatively unresponsive to light reflected by fluorescent ink illuminated by white light. More specifically, the commercially available National Ink No. 35-48-J (Fluorescent Yellow) is substantially invisible to the high resolution camera 22 when illuminated by the white light source 24.

Each camera 16 and 22 may be pointed towards a first mirror (not shown), which may be pointed towards a second mirror (not shown), which may be pointed at the conveyor 12 to alter the optical path from the camera to the conveyor 12. The optical path from the low resolution camera 16 to the conveyor 12 is preferably 52 inches, and the optical path from the high resolution camera 22 to the conveyor 12 is preferably 98 inches. These parameters may be varied somewhat without unduly affecting the performance of the present invention. Those skilled in the art will appreciate that mirror systems can be used to increase the optical path length of a camera system while accommodating a smaller physical distance between the camera and the object to be imaged. See, for example, Smith et al., U.S. Pat. No. 5,308,960, incorporated herein by reference.

The cameras 16 and 22 are positioned approximately 52 inches apart and 25 inches above the center of the conveyer 12 and each have an 18 inch wide field of view at the conveyor. In the preferred configuration shown in FIG. 1, the low resolution camera 16 remains focused at a height of four inches above the conveyor. The focal height of four inches above the conveyor 12 corresponds to the average expected height of parcels 14a through 14n handled by the OCR system 10. The low resolution camera 16 has a field of view that is approximately 16 inches wide at its focal height. The high resolution camera 22 uses an optical path equalizer to focus on parcels of different heights. The preferred optical path equalizer is described in the commonly owned pending and allowed U.S. patent application Ser. No. 08/292,400, "Optical Path Equalizer" filed Aug. 18, 1994, inventors Johannes A. S. Bjorner and Steven L. Smith, incorporated herein by reference.

A belt encoder 26 provides a signal indicating the speed of the conveyor 12 to a video processor 28 and to the high resolution camera 22. The belt encoder 26 is a standard belt driven opto-mechanical encoder. The video processor 28 controls the operation of the low resolution camera 22 and sequentially transmits a one-bit (i.e., black/white) video signal corresponding to the image captured by the low resolution camera 16 to a host computer 30. The high resolution camera 22 transmits an eight-bit grey-scale video signal corresponding to the image captured by the high resolution camera 22 to the host computer 30. The host computer 30 is preferably a general purpose computer comprising a standard microprocessor such as Heurikon HKV4d 68040 CPU board and a special purpose high speed image acquisition and processing board set such as the 150/40 series manufactured by Imaging Technologies, Inc. of Bedford Massachusetts. The operation of the cameras 16 and 22, the video processor 28, and the host computer 30 are described with more particularity with respect to FIG. 4.

Figure 2:
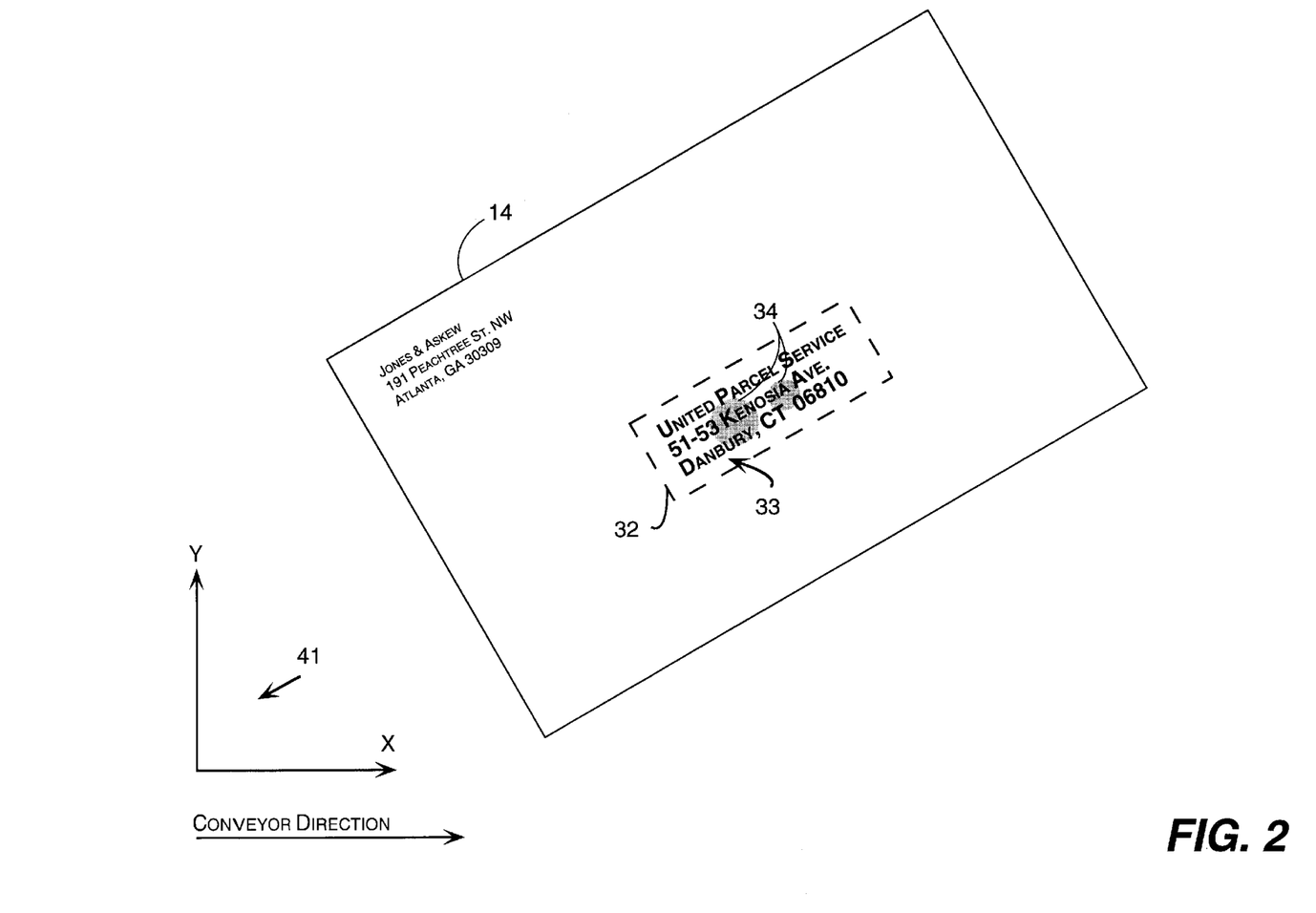
FIG. 2 is a diagram of a parcel including a fluorescent ink fiduciary mark located within the destination address block of the parcel.

Referring to FIG. 2, a parcel 14 bears a destination address block 32 containing text 33 defining the destination address of the parcel 14. A fluorescent ink fiduciary mark 34 is located approximately in the center of the destination address block 32 in the same area as the text 33 defining the destination address. As shown in FIG. 2, the text 33 may be oriented at an angle with respect to the OCR coordinate system 41.

Figure 3:
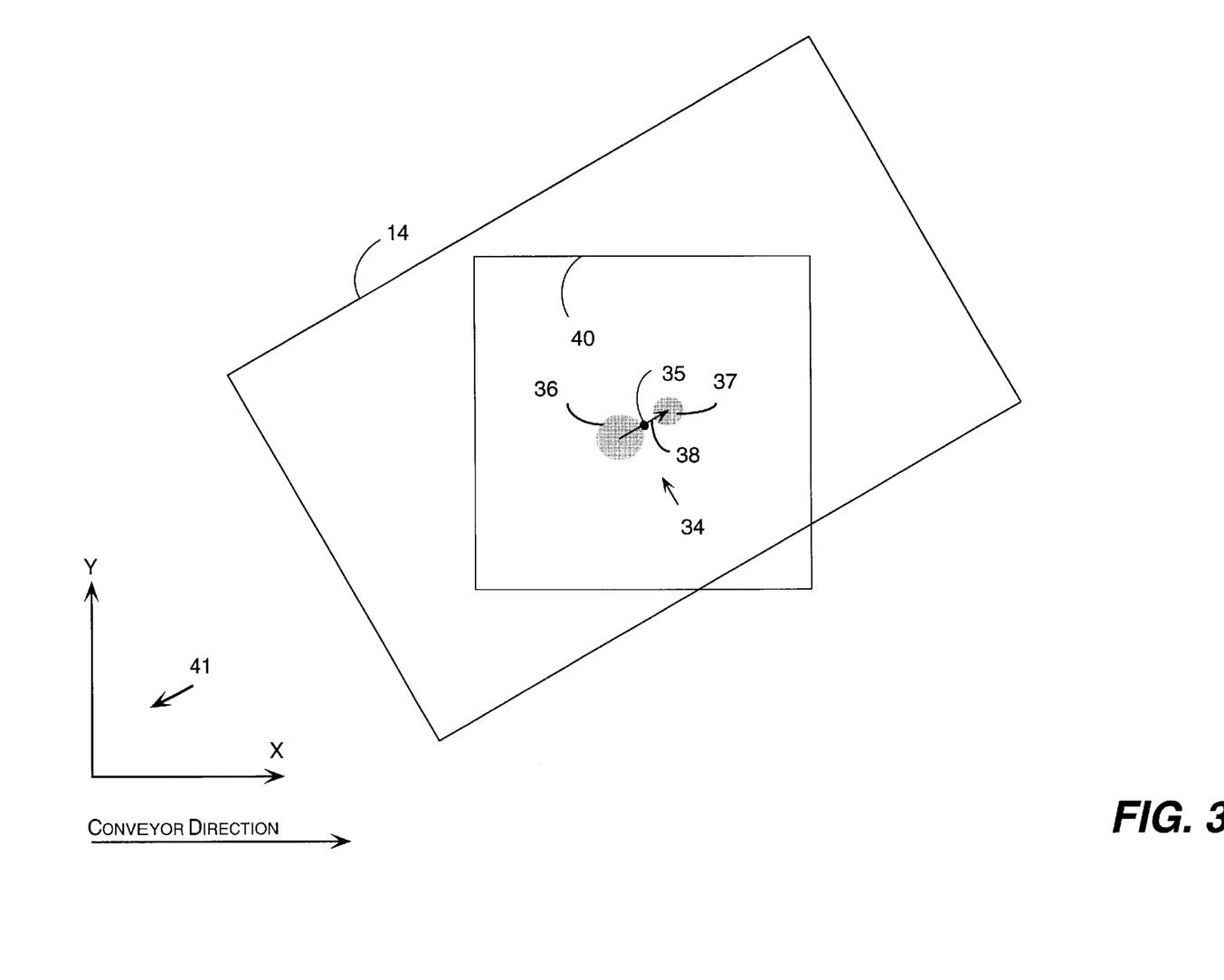
FIG. 3 is a diagram of a parcel including a region of interest defined around a fiduciary mark.

FIG. 3 shows the configuration of the preferred fiduciary mark 34 which comprises two fluorescent ink non-overlapping circles of different diameter. As used herein, a circle means either an annulus or the area bounded by an annulus. The fiduciary mark 34 includes a large circle 35 and a small circle 37 oriented such that a vector 38 from the center of large circle 36 to the center of the small circle 37 is oriented approximately in the same direction as underlying text 33. The position of the fiduciary mark 34 is defined to be the mid-point 39 of the vector 38. It will be clear to one skilled in the art that alternative embodiments might include locating the fiduciary mark elsewhere on the parcel in a known relation to text bearing area 32, or in a different known relationship to the underlying text. The fiduciary mark 34 is typically stamped on a parcel using a conventional ink stamp after the destination address 33 has been affixed to the parcel. It will be appreciated that the fiduciary mark 34 might be carried on a label, preprinted upon the parcel, or might be carried upon a transparent envelope into which an address label is placed.

For the preferred fiduciary mark 34, the diameter of large circle 36 is approximately ¾ of an inch, the diameter of small circle is approximately 7/16 of an inch, and the distance separating them is approximately ¼ of an inch. It is noted that a limit is imposed upon the size of the fiduciary mark 34 by the resolution of the low resolution camera 16. For example, the fiduciary mark 34 may be made smaller if the low resolution camera 16 has a higher resolution, and the resolution of camera 16 may be reduced if the fiduciary mark 34 is made larger. Acceptable performance is observed for the preferred configuration shown in FIG. 1 when the above fiduciary mark parameters are used. Alternative embodiments might vary the size of the components of fiduciary mark 34 somewhat without unduly affecting the performance of the present invention.

FIG. 3 also shows a region of interest 40 defined with respect to the fiduciary mark 34. The region of interest 40 is defined in terms of the high resolution camera to be a 1 k by 1 k square (i.e., 1,024 pixels by 1,024 pixels, which is equivalent to four inches by four inches). The region of interest 40 is orthogonally oriented with respect to the OCR coordinate system 41 and centered on the defined position 39 of the fiduciary mark 34. The host computer 30 creates and stores a bit map image of a small area comprising the fiduciary mark 34 from the data captured by the low resolution camera 16 as a parcel 14 passes through the field of view of the low resolution camera 16. The host computer 30 then determines the position and orientation of the fiduciary mark 34 and defines the region of interest 40 with respect to the position 39 of the fiduciary mark 34. The host computer then creates and stores a high resolution text image within the region of interest 40 from the data captured by the high resolution camera 22 as the parcel 14 passes through the field of view of the high resolution camera 22. In this manner, only a relatively small portion of the data captured by the high resolution camera 22 is saved for processing by the host computer 30.

Figure 4:
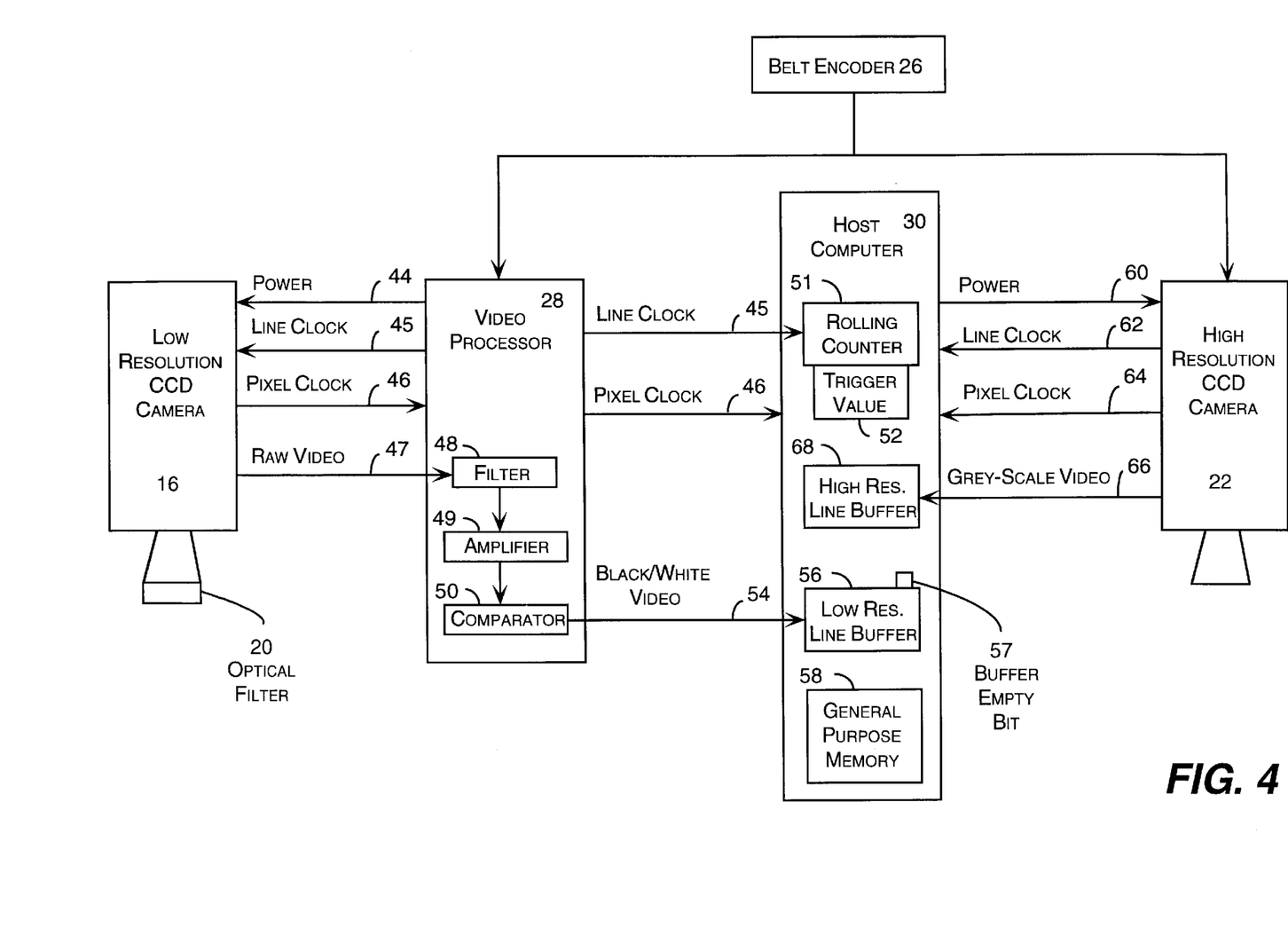
FIG. 4 is a functional block diagram illustrating the flow of information in a two camera OCR system.

FIG. 4 shows the connections among the belt encoder 26, the low resolution camera 16, the video processor 28, the host computer 30, and the high resolution camera 22. The belt encoder 26 supplies a signal indicating the speed of the conveyor 12 to the video processor 28 and the high resolution camera 22. The video processor 28 provides a power supply 44 and a line clock signal 45 to the low resolution camera 16. The line clock signal 45 is used to trigger cycles of the low resolution camera 16 (i.e., exposures of the line of CCD pixels comprising the low resolution camera 16). Each cycle captures a row of the image of the surface of a parcel 14 as it moves past the low resolution camera 16. The belt encoder 26 is selected to provide a pulse for each cycle of the high resolution camera 22. The high resolution camera 22 uses 4,096 pixels and has an exposure width of 16 inches. The belt encoder 26 is therefore selected to provide 4,096 pulses for every 16 inches of travel of the conveyor belt 12. The low resolution camera includes 256 pixels and also has an exposure width of 16 inches. The line clock signal 45 for the low resolution camera 16 therefore includes one trigger pulse for every 16 pulses of the belt encoder 26 so that the high resolution camera 22 has 16 cycles for each cycle of the low resolution camera 16. In this manner, the line images captured by the cameras 16 and 22 may be assembled by the host computer 30 into two-dimensional images with the correct aspect ratios (i.e., the ratio of the length of an image to its width).

The low resolution camera 16 transmits a pixel clock signal 46 and a raw video signal 47 to the video processor 28. The raw video signal 47 comprises a sequence of analog line signals, each line signal comprising 256 CCD signals created by a cycle of the low resolution camera 16. The pixel clock signal 46 comprises 256 pixel pulses per cycle, one pixel pulse for each of the 256 CCD signals read during a cycle of the low resolution camera 16. The video processor 28, which is a standard one-bit A/D converter, includes a filter 48 that sharpens the raw video signal 47, an amplifier 49 that increases the magnitude of the raw video signal, and a comparator 50 that compares each CCD signal of the raw video signal 47 to a threshold value to produce a black/white video signal 54. As used herein, a black/white video signal is a pixelized signal with uniform foreground and background pixel values wherein each foreground pixel is "on" and each background pixel is "off". The threshold value is selected in view of the filter 20 so that foreground pixels are only produced by fluorescent indicia, such as that produced by fluorescent ink illuminated by ultraviolet light. Thus, the low resolution camera 16 captures an image of the fiduciary mark 34 without capturing an image of the underlying text 33.

The line clock signal 45 and the pixel clock signal 46 are transmitted from the video processor 26 to the host computer 30. It will be appreciated that these signals may be used to generate x,y coordinates in the OCR coordinate system 41 for each pixel of the black/white video signal 54. The black/white video signal 54 is transmitted from the video processor 28 to the host computer 30 where it is initially captured, one line at a time, in a 256 by one-bit FIFO low resolution line buffer 56. The CPU of the host computer 30 is interrupted each cycle of the line clock 45 to read the contents of the low resolution line buffer 56. The CPU first checks the status of a buffer empty bit 57 to determine whether the low resolution line buffer 56 contains data (i.e., whether any foreground pixels are included in the most recent line image captured by the low resolution camera 16), and reads the contents of the low resolution line buffer 56 only if the buffer empty bit 57 is not set.

The host computer 30 receives a new line image from the low resolution camera 16 each cycle of the line clock 45 and determines whether each line image contains foreground pixels. If a line image contains foreground pixels, the host computer 30 computes the x,y coordinates for the foreground pixels using the line clock signal 45 (for the x coordinate) and the pixel clock signal 46 (for the y coordinate) and places the x,y coordinates in the low resolution line buffer 56. The low resolution line buffer 56 captures and momentarily (i.e., the duration of a cycle of the line clock 45) retains x,y coordinates of the foreground pixels captured by the low resolution camera 16. The host computer sequentially reads the low resolution line buffer 56 and creates and stores a two-dimensional bit map image from the foreground pixel data read from the low resolution line buffer 56 in a general purpose computer memory 58. Those skilled in the art will appreciate that a signal from a belt encoder indicating the speed of a conveyor, a line-scan CCD camera, a FIFO buffer, and a general purpose computer memory can be used to produce and control the aspect ratio of a two-dimensional computer image of an object conveyed past the camera. See, for example, Shah et al., U.S. Pat. No. 5,291,564, which is incorporated by reference.

The host computer 30 creates and stores a separate image for the fiduciary mark 34 on each parcel conveyed past the low resolution camera 16. Provided that a partially completed image of a fiduciary mark 34 has not been constructed, a new image is started each time foreground pixels are found in the low resolution line buffer 56. An image is considered complete when no foreground pixels are found in the low resolution line buffer 56 for 16 consecutive cycles of the line clock 45. The distance traveled by the conveyor 12 in 16 cycles of the line clock 45 is approximately four times the distance separating the large circle 36 and the small circle 37 of a nominal fiduciary mark 34. In this manner, the host computer 30 creates and stores a separate foreground pixel image for the fiduciary mark 34 on each parcel 14a through 14n. Those skilled in the art will appreciate that foreground images may be created and stored by the host computer 30 in various formats including bit maps and run-length encoded images.

The host computer 30 counts the cycles of the line clock 45 in a rolling counter 51. The rolling counter 51 is used to keep track of the positions of parcels in the x coordinate of the OCR coordinate system 41 (i.e., the direction in which the conveyor 12 travels). The host computer 30 determines the position and orientation of a fiduciary mark 34 and defines a region of interest 40 around the mark. The host computer 30 then determines the number of cycles of the line clock 45 required for the region of interest 40 to reach the field of view of the high resolution camera 22, adds this number to the value in the counter 51, and stores the result as a trigger value 52 for storing data subsequently captured by the high resolution camera 22. The host computer 30 determines that the region of interest 40 has reached the field of view of the high resolution camera 22 when the value in the counter 51 is equal to the trigger value 52. The host computer 30 then extracts from the high resolution buffer 68 the data within the region of interest 40 until the counter 51 increments a predetermined number times (64 increments in the preferred configuration) and clears the trigger value 52. The extracted region of interest data is stored in the general purpose memory 58.

The host computer 30 provides a power supply 60 to the high resolution camera 22 which provides a line clock signal 62, a pixel clock signal 64, and a grey-scale video signal 66 to the host computer. The line clock signal 62 and the pixel clock signal 64 for the high resolution camera 22 are analogous to the line clock signal 45 and the pixel clock signal 46 for the low resolution camera 16, except that they produce 16 cycles for each cycle of the low resolution camera. It will be appreciated that these signals may be used to generate x,y coordinates in the OCR coordinate system 41 for each pixel of the grey-scale video signal 66. The operation of a conventional CCD camera such as the high resolution camera 22 in producing a grey-scale video signal such as the grey-scale video signal 66 is well known in the art and will not be further described herein.

The grey-scale video signal 54 is transmitted from the high resolution camera 22 to the host computer 30 where it is initially captured, one line at a time, in a 4,096 by eight-bit high resolution line buffer 68. The high resolution line buffer 68 captures and momentarily (i.e., the duration of a cycle of the line clock 62) retains the grey-scale pixel data captured during a cycle of the high resolution camera 22. The host computer 30 sequentially reads the high resolution buffer 68, extracts data that is within the region of interest 40, and creates and stores a two-dimensional image of the region of interest 40 in the general purpose memory 58 of the host computer 30. Thus, only the high resolution data within the region of interest 40 is stored for processing by the host computer 30. A suitable method and system for producing a computer image from eight-bit grey-scale pixel data is described in the commonly owned pending U.S. patent application Ser. No. 08/380,732, "Method and Apparatus for Separating Foreground From Background in Images Containing Text" filed Jan. 31, 1995, inventors Michael C. Moed and Izrail S. Gorian, which is incorporated by reference. Those skilled in the art will appreciate that grey-scale images may be created and stored by the host computer 30 in various formats including bit maps and run-length encoded images.

Figure 5:
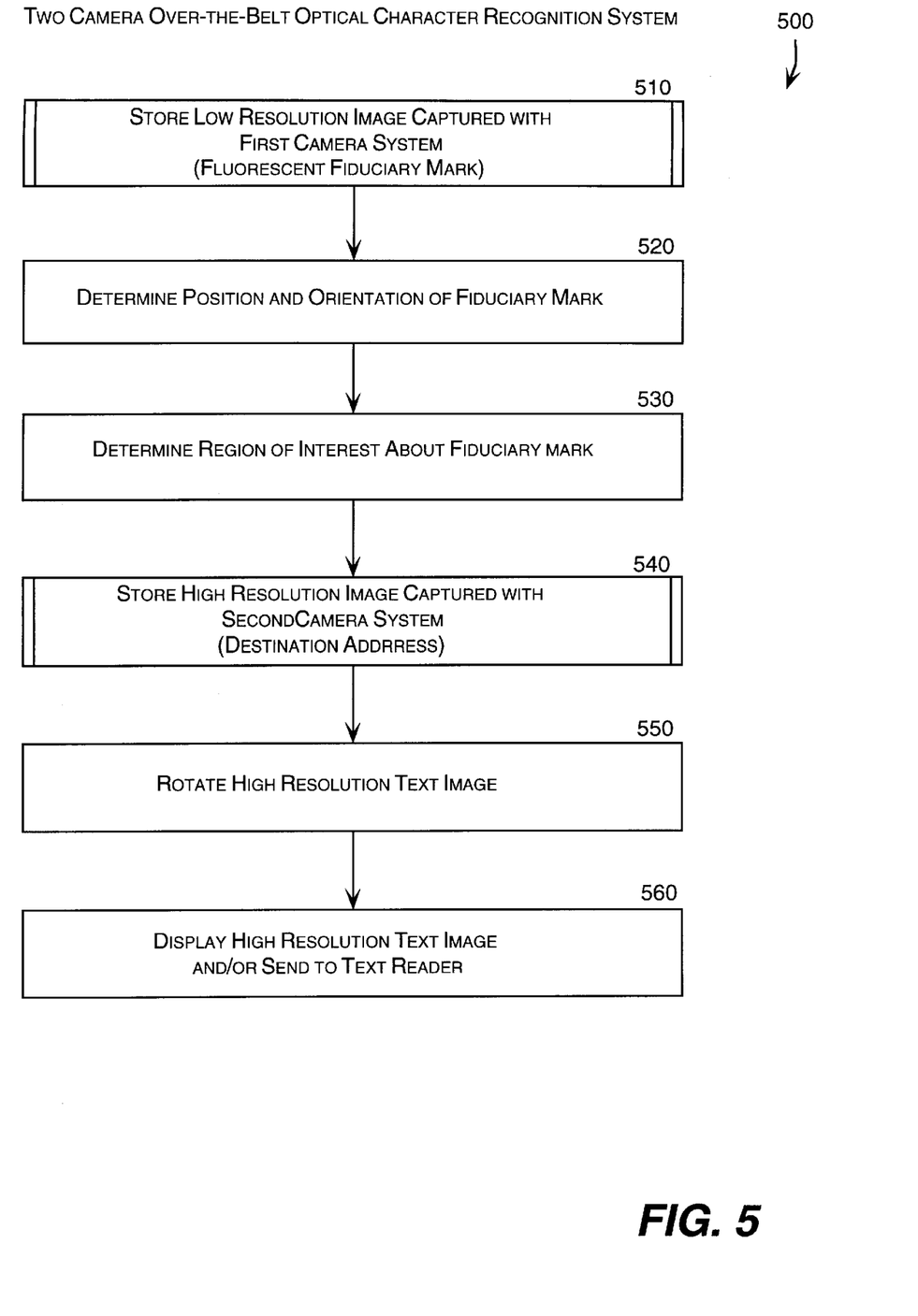
FIG. 5 is a logical flow diagram for a two camera over-the belt OCR system.

FIG. 5 is a logical flow diagram of the image processing method 500 performed by the two camera over-the-belt OCR system 10. In routine 510, a low resolution CCD camera 16 captures an image of a fluorescent ink fiduciary mark 34 located within the destination address block 32 on a parcel 14 (see FIG. 2). The steps associated with routine 510 will be described more particularly with reference to FIGS. 6–8. In the next step 520, the position and orientation of the fiduciary mark 32 is determined. In the next step 530, a region of interest 40 is defined about the fiduciary mark 34 (see FIG. 3). In routine 540, a high resolution CCD camera 22 captures a grey-scale image of the parcel 14 as it is conveyed through the field of view of the high resolution camera 22, and a host computer 30 extracts and stores a grey-scale image of the region of interest 40. The steps associated with routine 540 are described with more particularity with reference to FIG. 9. In step 550 the text image stored in step 540 is rotated to coincide with the x axis of the OCR coordinate system 41. In step 560, the text image is displayed on a display device such as a computer screen and/or sent to a computer-implemented text reader.

A suitable method and system for step 520 is described in the commonly owned pending U.S. patent application Ser. No. 08/419,176, "Method for Locating the Position and Orientation of a Fiduciary Mark" filed Apr. 10, 1995, inventors James Stephen Morton and James Vincent Recktenwalt, which is incorporated by reference. A suitable method and system for step 550 is described in the commonly owned pending U.S. patent application Ser. No. (to be assigned), "Method and System for Fast Rotation of Run-Length Encoded Images" filed Jul. 26, 1995, inventors Jie Zhu, Michael C. Moed, and Izrail S. Gorian, which is incorporated by reference.

Figure 6:
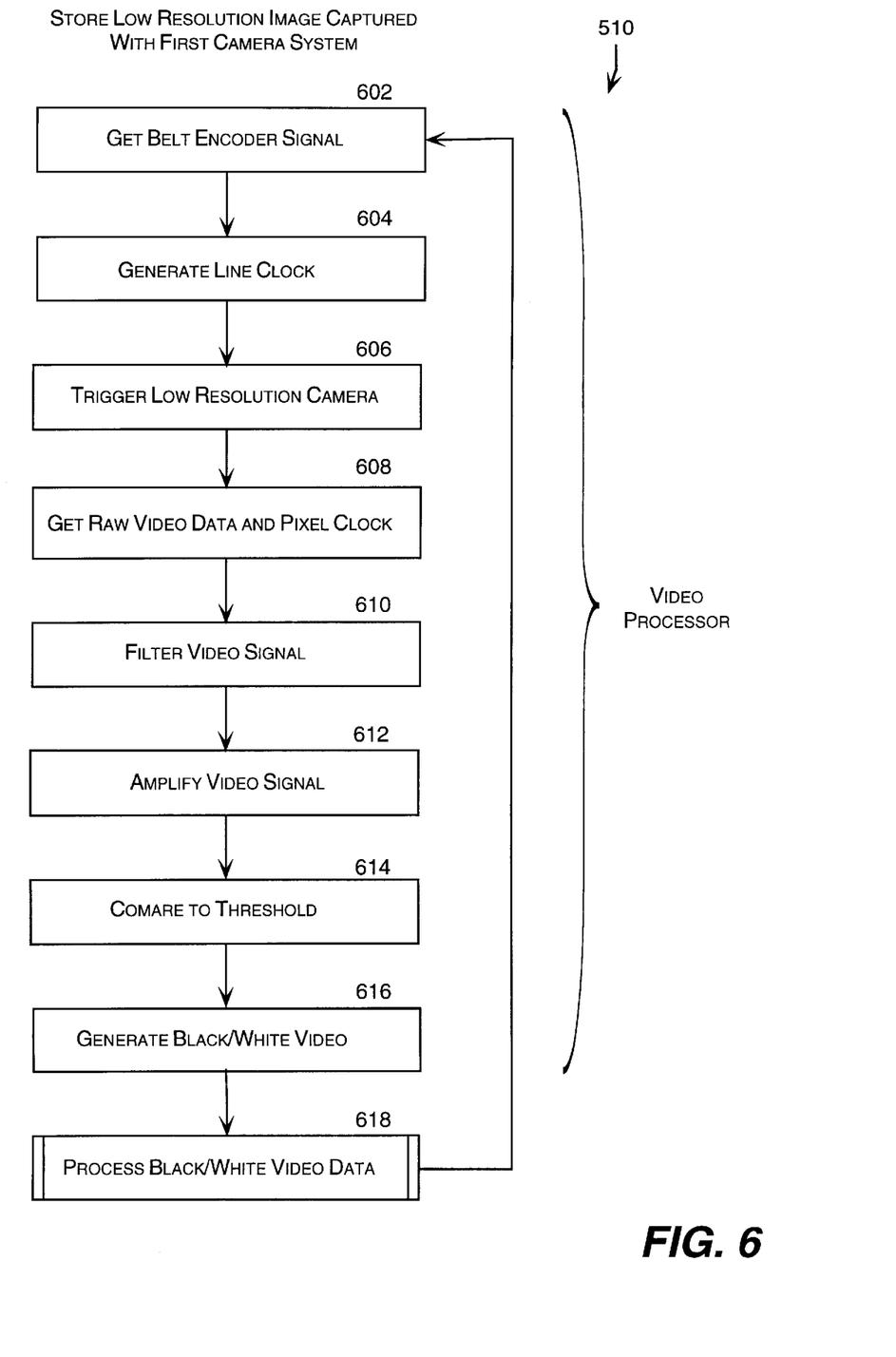
FIG. 6 is a logical flow diagram for a computer-implemented routine for storing a low resolution image from data captured with the first camera of a two camera OCR system.

FIG. 6 shows the steps associated with routine 510 (from FIG. 5) for storing a low resolution image captured with the first camera system 16. In step 602, the video processor 28 receives a signal from the belt encoder 26 indicating the speed of the conveyor belt 12. In step 604, the signal from the belt encoder 26 is used to generate a line clock signal 45. The line clock signal 45 for the low resolution camera 16 includes one pulse for each 16 pulses of the signal from the belt encoder 26. In step 606, the line clock signal 45 triggers a cycle of the low resolution camera 16. In step 608, the raw video data 47 and pixel clock signal 46 are returned from the low resolution camera 16 to the video processor 28. The raw video signal 47 is then filtered in step 610, amplified in step 612, and compared to a threshold in step 614 to produce a black/white video signal 54 in step 616. The black/white video signal 54 is then transmitted from the video processor 28 to a low resolution line buffer 56 in the host computer 30. The host computer 30 generates x,y coordinates for foreground pixel data in the black/white video signal 54 using the line clock signal 45 (for the x coordinate) and the pixel clock signal 46 (for the y coordinate). The coordinates of the foreground pixels are then captured in the low resolution line buffer 56 and ultimately stored for processing in the general purpose memory 58 of the host computer 30.

Figure 7:
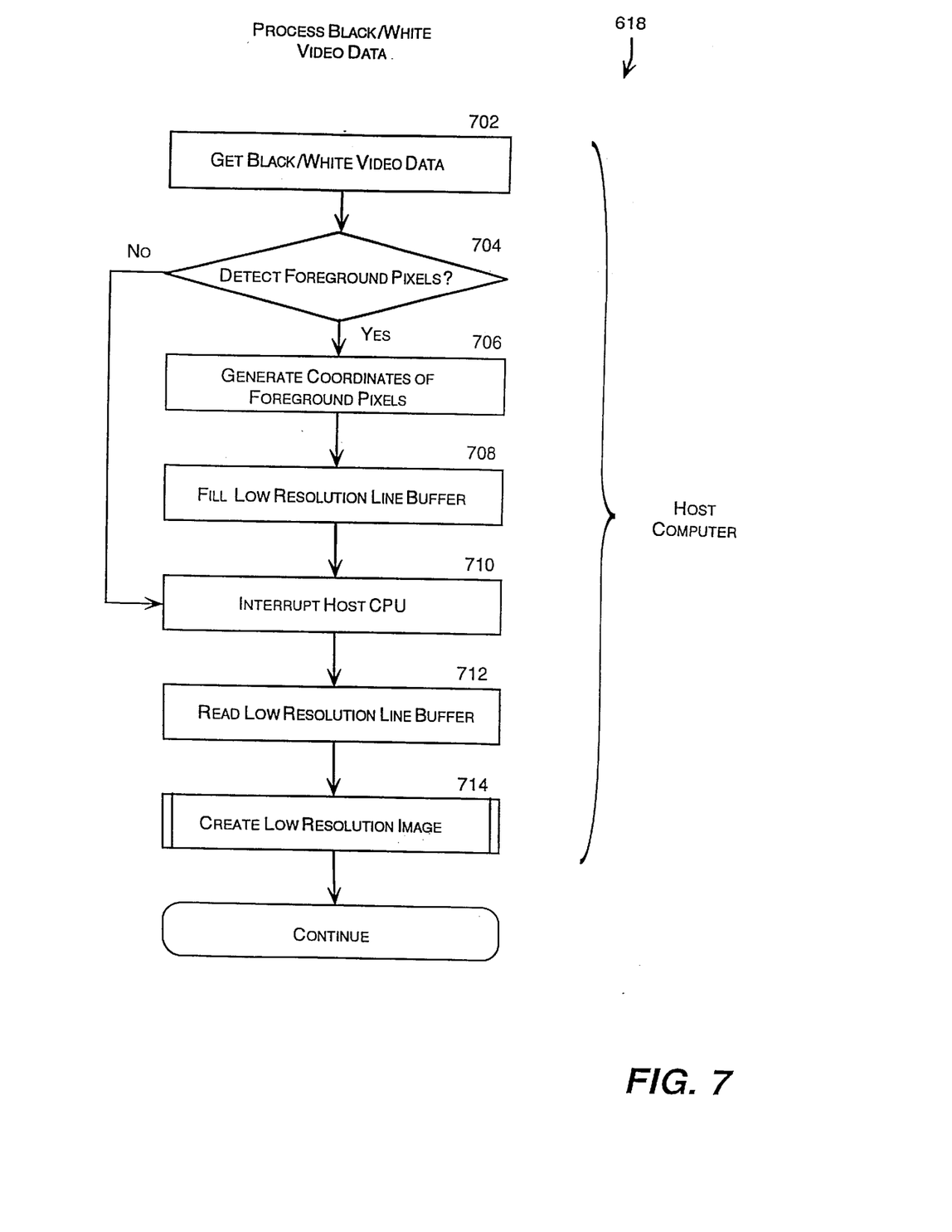
FIG. 7 is a logical flow diagram for a computer-implemented routine for processing black/white data captured with the first camera of a two camera OCR system.
Figure 8:
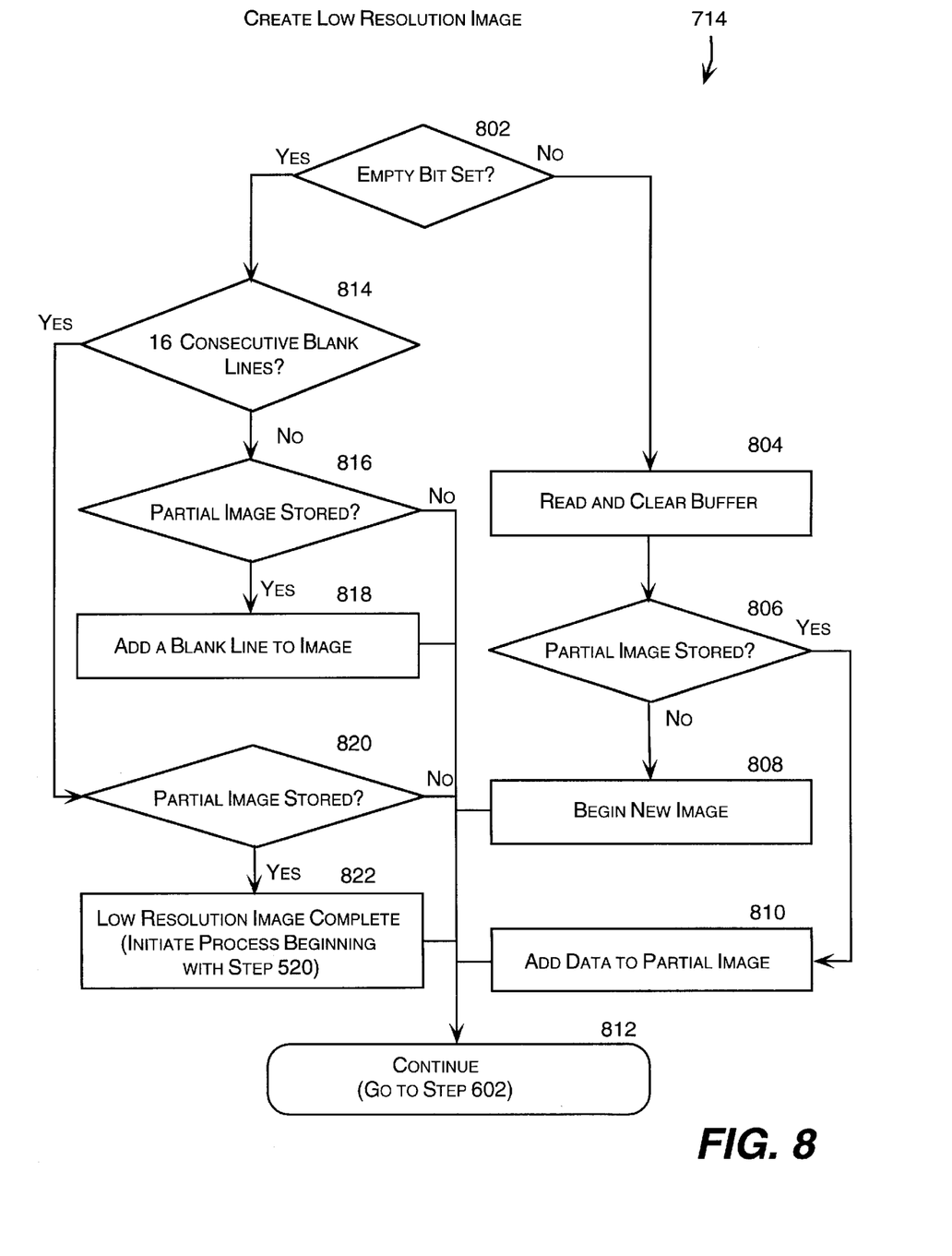
FIG. 8 is a logical flow diagram for a computer-implemented routine for creating a low resolution image from black/white data captured with the first camera of a two camera OCR system.

The low resolution image stored in the general purpose memory 58 is then processed by the host computer 30 in routine 618, which is described with more particularity with respect to FIGS. 6–8. The low resolution camera 16 continuously produces an image of the conveyor belt 12 and the parcels carried by the conveyor belt 14 which is converted to the black/white video signal 54. The host computer 30 generates x,y coordinates for the foreground pixels (i.e., pixels exposed by the light produced by the fluorescent ink fiduciary mark) of the black/white video signal 54 and stores them in the general purpose memory 58 in the form of a twodimensional bit map. A separate bit map is constructed for each fiduciary mark 34.

FIG. 7 shows the steps of routine 618 (from FIG. 6) for processing the black/white video data 54 stored in the low resolution line buffer 56. In step 702, the host computer 30 receives the black/white video data 54 from the video processor 28. In decision step 704, it is determined whether there are any foreground pixels in the black/white video signal 54. If there are no foreground pixels in the black/white video signal 54, the "no" branch is followed from step 704 to step 710 in which the CPU of the host computer 30 is interrupted. If there are foreground pixels in the black/white video signal 54, the "yes" branch is followed from step 704 to step 706 in which the x,y coordinates of the foreground pixels are generated. The x,y coordinates are defined with respect to the OCR coordinate system 41 with the y coordinate defined relative to a edge of the conveyor 12 and the x coordinate defined relative to the value in the counter 51. The line clock signal 45 is used to generate the x coordinate, and the pixel clock signal 46 is used to generate the y coordinate. Step 706 is followed by step 708 in which the x,y coordinates of the foreground pixels are captured and momentarily retained in the low resolution line buffer 56.

The "no" branch of decision step 704 and the "yes" branch (via steps 706 and 708) are followed by step 710 in which the CPU of the host computer 30 is interrupted. The CPU is interrupted each cycle of the line clock 45 regardless of whether foreground pixel data has been placed in the low resolution buffer 56 so that blank lines may be built into the bit map image of the fiduciary mark 34. In response to the interrupt signal generated during step 710, the low resolution line buffer 56 may be read in step 712. In routine 714, a two dimensional bit map image of a fiduciary mark 34 is created. The steps associated with routine 714 are described with more particularity with reference to FIG. 8.

FIG. 8 shows the steps of routine 714 (from FIG. 7) for creating a low resolution image of a fiduciary mark 34. The first step of routine 714 is decision step 802 in which the empty bit 57 of the low resolution buffer 56 is checked. The empty bit 57 may be a software register, or it may be a pin that is latched to a predetermined voltage. The empty bit 57 indicates whether there is data in the low resolution buffer. If the buffer empty bit 57 is not set, the "no" branch is followed from step 802 to step 804 in which the contents of the low resolution line buffer 56 are read and the buffer is cleared. Step 804 is followed by decision step 806 in which it is determined whether there is a partial image of a fiduciary mark stored in the general purpose memory 58 of the host computer 30. If there is no partial image stored, the "no" branch is followed to step 808 in which a new fiduciary mark image is started. If there is a partial image stored, the "yes" branch is followed from step 806 to step 810 in which the data from the low resolution line buffer 56 is added to the partial image. Steps 808 and 810 are followed by step 812 in which the computer implemented routine 510 loops back to step 602 (FIG. 6) to begin another cycle.

Referring again to step 802, if the empty bit is set, the "yes" branch is followed from step 802 to decision 814 in which it is determined whether the low resolution line buffer 56 has been empty for 16 consecutive cycles of the line clock 45 (i.e., 16 consecutive blank lines). If there have not been 16 consecutive blank lines, the "no" branch is followed to decision step 816 in which it is determined whether a partial image is stored. If a partial image is not stored, the "no" branch is followed to the continue step 812 in which the computer implemented routine 510 loops back to step 602 to begin another cycle. If a partial image is stored, step 816 is followed by step 818 in which a blank line is added to the partially stored image. Step 818 is then followed by the continue step 812 in which the computer implemented routine 510 loops back to step 602 to begin another cycle. Referring again to step 814, if there have been 16 consecutive blank lines read from the low resolution line buffer 56, the "yes" branch followed from step 814 to the decision step 820 in which it is determined whether a partial image is stored. If a partial image is not stored, the "no" branch is followed from step 820 to the continue step 812 in which the computer implemented routine 510 loops back to step 602 to begin another cycle. If a partial image is stored, the "yes" branch is followed from step 820 to step 822 in which the low resolution image is deemed to be complete. Step 822 is then followed by the continue step 812 in which the computer implemented routine 510 loops back to step 602 to begin another cycle.

Upon reaching step 822, a complete image of a fiduciary mark 34 has been stored in the general purpose memory 58 of the host computer 30. Referring to FIG. 5, steps 520 through 560, which require a complete image of a fiduciary mark 34, are then initiated. It will be appreciated that the computer-implemented routine 510 loops back to step 602 to each cycle of the line clock 45, whereas the steps 520 through 560 are only completed from time to time in response to a complete image of a fiduciary mark 34 having been constructed pursuant to routine 510. Thus step 822, which indicates that routine 510 has stored an image of a complete fiduciary mark 34 in the general purpose memory 58, is followed by steps 520 through 560, which require a complete image of a fiduciary mark 34, as well as a loop back to step 602 to for another cycle of the line clock 45.

Figure 9:
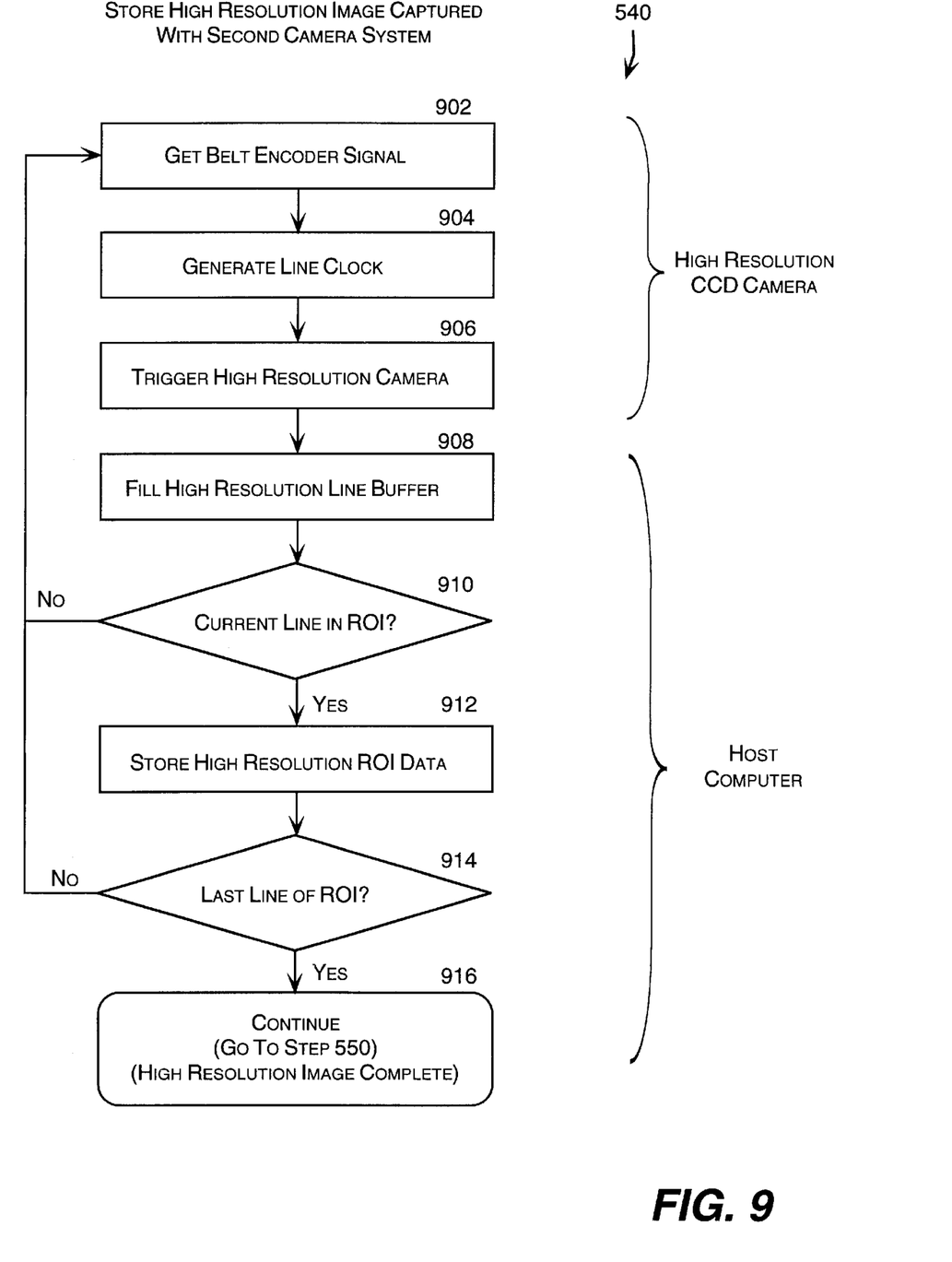
FIG. 9 is a logical flow diagram for a computer-implemented routine for storing a high resolution image from data captured with the second camera of a two camera OCR system.

FIG. 9 shows the steps associated with routine 540 (from FIG. 5) for storing a high resolution image captured with the second camera system 22. In step 902, the high resolution camera 22 receives a signal from the belt encoder 26 indicating the speed of the conveyor belt 12. In step 904 the signal from the belt encoder 26 is used to generate a line clock signal 62 for the high resolution camera. In step 906, the line clock 62 triggers a cycle of the high resolution line camera 22 for each pulse of the signal received from the belt encoder 26. In step 908 the grey-scale video image 66 captured by a cycle of the high resolution line camera 22 is captured and momentarily (i.e., for the duration of one cycle of the line clock 62) retained in the high resolution line buffer 68.

Step 908 is followed by decision step 910 in which it is determined whether the data in the high resolution line buffer 68 corresponds to a line which is in the region of interest 40. Routine 540 determines the number of cycles of the line clock 45 required for the region of interest 40 to reach the field of view of the high resolution camera 22, adds this number to the value in the counter 51, and stores the result as a trigger value 52 for storing data subsequently captured by the high resolution camera 22. Routine 540 then determines that the region of interest 40 is within the field of view of the high resolution camera 22 when the value in the counter 51 is equal to the trigger value 52. The region of interest 40 remains in the field of view of the high resolution camera 22 for a predefined number of cycles of the line clock 45 (i.e., 64 cycles in the preferred configuration shown n FIG. 1 corresponding to a four inch wide region of interest and 16 cycles of the line clock 45 per inch of travel of the conveyor 12). The host computer 30 therefore extracts from the high resolution buffer 68 the data within the region of interest 40 until the counter 51 increments a predetermined number times (64 increments in the preferred configuration) and clears the trigger value 52. The extracted region of interest data is stored in the general purpose memory 58.

Referring again to step 910, if the current line is not within the region of interest 40, the "no" branch is followed from step 910 back to step 902 for another cycle of the high resolution camera 22. If the line is within the region of interest 40, the "yes" branch is followed from step 910 to step 912 in which the portion of the data stored in the high resolution line buffer 68 which is within the general interest 40 is extracted from the line buffer 68 and stored in the general purpose computer memory 58 of the host computer 30. Step 912 is followed by the decision step 914 in which it is determined whether the line stored in the general purpose computer memory 58 in step 912 was the last line of the region of interest 40. If it was the last line, the "no" branch is followed back to step 902 for another cycle of the high resolution line camera 22. If it was the last line in the region of interest 40, the high resolution image of the region of interest 40 is deemed to be complete and the "yes" branch is followed to the continue step 916 which causes the image processing method 500 to exit routine 540. The continue step 916 is then followed by step 550 of the image processing method 500 shown on FIG. 5.

In view of the foregoing, it will be appreciated that the low resolution camera 16 captures a new line image each cycle of the line clock 45. The host computer 30 only computes the x,y coordinates for the foreground pixels in the resulting black/white video data stream 54 for ultimate storage in the general purpose memory 58. Similarly, the high resolution camera 22 captures a new grey-scale line image which is captured in the high resolution line buffer 56 each cycle of the line clock 62. The host computer 30 then extracts from the high resolution line buffer 56 for ultimate storage in the general purpose memory 58 only the data that is within the region of interest 40. Thus, the two camera OCR system 10 limits the amount of low resolution data and the amount of high resolution data that must be stored in the general purpose memory 58 for processing by the host computer 30.

Those skilled in the art will appreciate that many different combinations of hardware will be suitable for practicing the present invention. Many commercially available substitutes, each having somewhat different cost and performance characteristics, exist for each of the physical components listed above. For example, the host computer 30 could be hard-wired logic, reconfigurable hardware, an application specific integrated circuit (ASIC), or some other equivalent means for implementing a set of instructions.

It should be understood that the foregoing relates only to the preferred embodiment of the present invention, and that numerous changes may be made therein without departing from the spirit and scope of the invention as defined by the following claims.

What is claimed is:

1. A method of capturing an image of readable indicia on an object, comprising the steps of:
    affixing a mark to the object such that the mark and the readable indicia are superimposed one upon the other, the mark being configured such that its location and orientation are capable of being determined by a camera having a resolution of 16 pixels per inch;
    capturing an image of the mark by exposing a side of the object to a first low resolution camera;
    creating a matrix defining a coordinate system corresponding to the image;
    translating a set of pixel values corresponding to the image of the mark into the matrix;
    determining the position and orientation of the mark with respect to the coordinate system from the image of the mark;
    defining a region about the position of the mark; and
    capturing an image of the readable indicia within the region by exposing the same side of the object to a second high resolution camera that is relatively unresponsive to the mark such that the readable indicia is readable within the image captured by the second camera despite the superimposition of the mark and the readable indicia.

2. The method of claim 1, further comprising the step of rotating the readable indicia by an angle defined with respect to the orientation of the mark.

3. The method of claim 1, wherein the mark comprises fluorescent ink.

4. The method of claim 3, wherein the indicia comprises text.

5. The method of claim 4, wherein the object comprises a parcel to be shipped and the indicia comprises the destination address for the parcel.

6. The method of claim 1, wherein the first camera comprises a low resolution CCD camera.

7. The method of claim 6, wherein the second camera comprises a high resolution CCD camera.

8. A system for capturing an image of readable indicia on an object comprising:
    a conveying system for moving an object adjacent to a low resolution first camera and a high resolution second camera;
    a mark and readable indicia superimposed one upon the other on the object, the mark being configured such that its location and orientation are capable of being determined by a camera having a resolution of 16 pixels per inch;
    the first camera operable for capturing an image of the mark by exposing a side of the object to the first camera;
    second camera operable for capturing an image of the readable indicia by exposing the same side of the object to the second camera, which is relatively unresponsive to the mark such that the readable indicia is readable within the image captured by the second camera despite the superimposition of the mark and the readable indicia; and
    a computer configured to,
        process the image of the mark to determine the position and orientation of the mark,
        define a region about the position of the mark, and
        trigger the second camera to capture an image of the readable indicia by capturing an image of the region.

9. The system of claim 8, wherein the computer is further configured to process the image of the region to rotate the image of the readable indicia by an angle defined with respect to the orientation of the mark.

10. The system of claim 8, wherein the mark comprises fluorescent ink.

11. The system of claim 10, wherein the indicia comprises text.

12. The system of claim 11, wherein the object comprises a parcel to be shipped and the indicia comprises the destination address for the parcel.

13. The system of claim 8, wherein the first camera comprises a low resolution CCD camera.

14. The system of claim 13, wherein the second camera comprises a high resolution CCD camera.

* * * * *